United States Patent
Turner et al.

(10) Patent No.: US 8,312,937 B2
(45) Date of Patent: Nov. 20, 2012

(54) BATTERY FOR A POWER TOOL WITH A BATTERY PACK EJECTOR

(75) Inventors: Terry L. Turner, Finksburg, MD (US); David C. Campbell, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 105 days.

(21) Appl. No.: 12/544,330

(22) Filed: Aug. 20, 2009

(65) Prior Publication Data

US 2010/0000067 A1    Jan. 7, 2010

Related U.S. Application Data

(63) Continuation of application No. 10/827,465, filed on Apr. 19, 2004, now Pat. No. 8,181,717, which is a continuation of application No. 10/652,915, filed on Aug. 29, 2003, now Pat. No. 7,661,486, which is a continuation of application No. 09/938,202, filed on Aug. 24, 2001, now Pat. No. 6,729,413.

(51) Int. Cl.
   *E21B 4/12*       (2006.01)
(52) U.S. Cl. .......................................... 173/217; 173/216
(58) Field of Classification Search .................. 173/213, 173/216, 217; 310/36, 50; 320/115, 116; 429/96, 97; 403/375, 381
   See application file for complete search history.

(56) References Cited

U.S. PATENT DOCUMENTS

| | | | |
|---|---|---|---|
| 1,036,063 A | 8/1912 | Bedell et al. | |
| 1,152,247 A | 8/1915 | Walker | |
| 2,104,772 A | 1/1938 | Saunders | |
| 2,261,230 A | 11/1941 | Cox et al. | |
| 2,460,149 A | 1/1949 | Schoensiegel | |
| 3,120,845 A | 2/1964 | Horner | |
| 3,186,878 A | 6/1965 | Filander | |
| 3,494,799 A | 2/1970 | Pedone, Jr. | |
| 3,734,207 A | 5/1973 | Fishbein | |

(Continued)

FOREIGN PATENT DOCUMENTS

DE        3115280 A1    4/1982

(Continued)

OTHER PUBLICATIONS

Japanese Abstract, 1484694, Portable Drills, Aug. 27, 1974, 1 page.

(Continued)

*Primary Examiner* — Rinaldi Rada
*Assistant Examiner* — Nathaniel Chukwurah
(74) *Attorney, Agent, or Firm* — Stephen R. Valancius

(57) ABSTRACT

A power tool has a mechanism for ejecting a battery pack which includes a receiving frame which defines a cavity to receive a battery pack. A receiving member is adjacent the cavity. The receiving member meshes with a member on the battery pack to hold the battery pack in the cavity. A biasing member is in the cavity adjacent the receiving member. The biasing member ejects the battery pack from the ejecting mechanism. A member retains the biasing member in the cavity. The member guides a portion of the battery pack meshing with the receiving member into contact with the biasing member such that when the battery pack is locked onto the frame, the biasing member is in a compressed condition and when the battery pack is an unlocked position, the biasing member ejects the battery pack from the frame.

13 Claims, 3 Drawing Sheets

U.S. PATENT DOCUMENTS

| | | |
|---|---|---|
| 3,757,194 A | 9/1973 | Weber et al. |
| 3,767,468 A | 10/1973 | Schusler |
| 3,883,789 A | 5/1975 | Achenbach et al. |
| 3,943,934 A | 3/1976 | Bent |
| 3,952,239 A | 4/1976 | Owings et al. |
| 3,973,179 A | 8/1976 | Weber et al. |
| 3,999,110 A | 12/1976 | Ramstrom et al. |
| 4,050,528 A | 9/1977 | Foltz et al. |
| 4,091,880 A | 5/1978 | Troutner et al. |
| 4,146,682 A | 3/1979 | Nakao |
| 4,191,917 A | 3/1980 | Brown et al. |
| 4,309,067 A | 1/1982 | Riley, Jr. |
| 4,371,594 A | 2/1983 | Ohara et al. |
| 4,386,609 A | 6/1983 | Mongeon |
| 4,392,101 A | 7/1983 | Saar et al. |
| 4,441,563 A | 4/1984 | Walton, II |
| 4,447,749 A | 5/1984 | Reeb, Jr. et al. |
| 4,517,263 A | 5/1985 | Reiss et al. |
| 4,522,898 A | 6/1985 | Esrom |
| 4,555,849 A | 12/1985 | Ando et al. |
| 4,563,629 A | 1/1986 | Keiper |
| 4,576,880 A | 3/1986 | Verdier et al. |
| 4,616,169 A | 10/1986 | Profitt |
| 4,616,171 A | 10/1986 | Hernandez et al. |
| 4,672,292 A | 6/1987 | Hernandez |
| 4,716,352 A | 12/1987 | Hurn et al. |
| 4,728,876 A | 3/1988 | Mongeon et al. |
| 4,736,742 A | 4/1988 | Alexson et al. |
| 4,749,049 A | 6/1988 | Greppmair |
| 4,751,452 A | 6/1988 | Kilmer et al. |
| 4,779,687 A | 10/1988 | Schreiber et al. |
| D300,132 S | 3/1989 | Culbertson et al. |
| 4,834,092 A | 5/1989 | Alexson et al. |
| 4,835,410 A | 5/1989 | Bhagwat et al. |
| 4,847,513 A | 7/1989 | Katz et al. |
| 4,853,607 A | 8/1989 | Walter et al. |
| D304,026 S | 10/1989 | Goodner et al. |
| 4,871,629 A | 10/1989 | Bunyea |
| 4,873,461 A | 10/1989 | Brennan et al. |
| 4,904,549 A | 2/1990 | Goodwin et al. |
| 4,930,583 A | 6/1990 | Fushiya et al. |
| D310,813 S | 9/1990 | Culbertson et al. |
| 4,957,831 A | 9/1990 | Meredith et al. |
| 4,981,108 A | 1/1991 | Faeroe |
| 5,013,993 A | 5/1991 | Bhagwat et al. |
| 5,026,384 A | 6/1991 | Farr et al. |
| 5,043,650 A | 8/1991 | Bhagwat et al. |
| D320,917 S | 10/1991 | Fushiya et al. |
| D320,974 S | 10/1991 | Culbertson |
| 5,054,563 A | 10/1991 | Zapf |
| 5,059,885 A | 10/1991 | Weiss et al. |
| D323,276 S | 1/1992 | Fushiya et al. |
| 5,080,983 A | 1/1992 | Alexon et al. |
| 5,089,738 A | 2/1992 | Bergqvist et al. |
| 5,095,259 A | 3/1992 | Bailey et al. |
| 5,122,427 A | 6/1992 | Flowers et al. |
| 5,136,469 A | 8/1992 | Carusillo et al. |
| 5,140,249 A | 8/1992 | Linder et al. |
| 5,144,217 A | 9/1992 | Gardner et al. |
| 5,148,094 A | 9/1992 | Parks et al. |
| 5,149,230 A | 9/1992 | Nett |
| 5,169,225 A | 12/1992 | Palm |
| 5,189,570 A * | 2/1993 | Maeda et al. .................. 360/75 |
| 5,200,280 A | 4/1993 | Karasa |
| 5,207,697 A | 5/1993 | Carusillo et al. |
| 5,208,525 A | 5/1993 | Lopic et al. |
| 5,213,913 A | 5/1993 | Anthony, III et al. |
| 5,220,520 A | 6/1993 | Kessoku |
| 5,221,210 A | 6/1993 | Bormuth et al. |
| 5,225,293 A | 7/1993 | Mitchell et al. |
| 5,229,702 A | 7/1993 | Boehling et al. |
| 5,235,261 A | 8/1993 | Philipp |
| 5,242,767 A | 9/1993 | Roback et al. |
| 5,244,755 A | 9/1993 | Benoist et al. |
| 5,248,928 A | 9/1993 | Gilmore |
| 5,263,972 A | 11/1993 | Evans et al. |
| 5,265,343 A | 11/1993 | Pascaloff |
| 5,268,630 A | 12/1993 | Bhagwat et al. |
| 5,298,821 A | 3/1994 | Michel |
| 5,306,285 A | 4/1994 | Miller et al. |
| 5,308,716 A | 5/1994 | Shababy et al. |
| 5,336,953 A | 8/1994 | Allemann |
| 5,348,815 A | 9/1994 | Barker |
| 5,350,317 A | 9/1994 | Weaver et al. |
| 5,352,969 A | 10/1994 | Gilmore et al. |
| 5,354,215 A | 10/1994 | Viracola |
| 5,360,073 A | 11/1994 | Akazawa |
| 5,366,477 A | 11/1994 | LeMariem, III et al. |
| 5,388,749 A | 2/1995 | Davignon et al. |
| 5,394,073 A | 2/1995 | Nagai |
| 5,399,446 A | 3/1995 | Takahashi |
| 5,401,592 A | 3/1995 | Gilpin et al. |
| 5,406,187 A | 4/1995 | Harrison |
| 5,447,807 A | 9/1995 | Peled et al. |
| 5,449,997 A | 9/1995 | Gilmore et al. |
| 5,456,994 A | 10/1995 | Mita |
| 5,460,906 A | 10/1995 | Leon et al. |
| D364,463 S | 11/1995 | Pitzen et al. |
| 5,480,734 A | 1/1996 | Schultz et al. |
| 5,489,484 A | 2/1996 | Wheeler et al. |
| 5,504,412 A | 4/1996 | Chan et al. |
| 5,551,883 A | 9/1996 | Davis |
| 5,553,675 A * | 9/1996 | Pitzen et al. .................. 173/217 |
| 5,557,190 A | 9/1996 | Brotto |
| 5,602,454 A | 2/1997 | Arakawa et al. |
| 5,620,808 A | 4/1997 | Wheeler et al. |
| 5,626,979 A | 5/1997 | Mitsui et al. |
| 5,629,602 A | 5/1997 | Makino |
| D379,795 S | 6/1997 | Pitzen et al. |
| 5,637,417 A | 6/1997 | Engmark et al. |
| 5,642,031 A | 6/1997 | Brotto |
| 5,660,945 A | 8/1997 | McCormick et al. |
| 5,663,011 A | 9/1997 | Bunyea et al. |
| 5,681,667 A | 10/1997 | Bunyea et al. |
| 5,789,101 A | 8/1998 | Wheeler et al. |
| 5,792,573 A | 8/1998 | Pitzen et al. |
| 5,869,204 A | 2/1999 | Kottke et al. |
| 5,881,823 A | 3/1999 | Kabatnik et al. |
| 5,919,585 A | 7/1999 | Wheeler et al. |
| 6,057,608 A | 5/2000 | Bailey, Jr. et al. |
| D436,917 S * | 1/2001 | Hayakawa et al. .......... D13/103 |
| 6,168,881 B1 | 1/2001 | Fischer et al. |
| 6,223,835 B1 | 5/2001 | Habedank et al. |
| RE37,226 E | 6/2001 | Wheeler et al. |
| 6,263,632 B1 * | 7/2001 | Cadorette ....................... 52/473 |
| 6,357,533 B1 | 3/2002 | Buchholz et al. |
| 6,376,942 B1 | 4/2002 | Burger et al. |
| 6,412,572 B2 | 7/2002 | Habedank et al. |
| 6,656,626 B1 | 12/2003 | Mooty et al. |
| 6,729,413 B2 | 5/2004 | Turner et al. |
| RE40,681 E | 3/2009 | Pitzen et al. |
| 7,661,486 B2 | 2/2010 | Turner et al. |
| 2004/0197175 A1 | 10/2004 | Turner et al. |

FOREIGN PATENT DOCUMENTS

| | | |
|---|---|---|
| DE | 3317398 | 11/1984 |
| DE | 3502449 | 8/1985 |
| DE | 3636968 | 5/1988 |
| DE | 3742240 | 6/1989 |
| DE | 4041247 A1 | 7/1991 |
| DE | 9002514 | 8/1991 |
| DE | 4029018 A1 | 3/1992 |
| DE | 42 08 804 | 9/1993 |
| DE | 9319361 U1 | 3/1994 |
| DE | 43 31 187 C2 | 4/1998 |
| DE | 195 49 398 C2 | 4/1998 |
| DE | 100 40 893 A1 | 8/2001 |
| EP | 0272434 A2 | 6/1988 |
| EP | 0 707 350 A1 | 4/1996 |
| EP | 0 776 080 A2 | 5/1997 |
| EP | 0 778 627 A1 | 6/1997 |
| EP | 1 030 385 A1 | 8/2000 |
| EP | 1 030 386 A1 | 8/2000 |
| EP | 1 036 636 A1 | 9/2000 |
| EP | 1 128 517 A2 | 8/2001 |
| JP | 57156635 | 9/1982 |
| JP | 4-328937 | 11/1992 |

| | | |
|---|---|---|
| JP | 5326024 | 12/1993 |
| JP | 6150978 | 5/1994 |
| JP | 2001143678 A * | 5/2001 |
| JP | 2001351592 A * | 12/2001 |
| WO | WO 91/03092 | 3/1991 |

OTHER PUBLICATIONS

Sony Overseas S.A., DM/011 603 of Aug. 29, 1988, International Design Bulletin, Aug. 1988, 2 pages.

Sony Overseas S.A. DM/029 376 of Apr. 20, 1994, International Design Bulletin, Apr. 1994, 3 pages.

Product Brochure entitled "Maxion™ Cordless Powered Instrument System Assembly, Operation and Maintenance"m by 3M HealthCare, 31 pages, no date.

Product Brochure entitled "The K-100 Mini-Driver System, Cleaning and Lubrication", by 3M Surgical Products Division, 5 pages, no date.

Product Brochure entitled "Cordless 800 Wire Driver", by Dyonics 1984, no month, 2 pages.

Product Brochure entitled "Cordless 450 Orthapaedic Drill" by Dyonics, 1984, no month, 2 pages.

Product Brochure entitled "Mini-Driver™ Air Instrument System", by 3M, 1975, no month, 4 pages.

Product Brochure entitled "Acculan", by Aesculap®, 4 pages, no date.

Product Brochure entitled "Cordless Sagittal Saw", by Dyonics, 1984, no month, 2 pages.

Product Brochure entitled "The Only Cordless Instrument Powerful Enough to be Stryker", by Stryker®, 1993, no month, 4 pages.

Product Brochure entitled "System 2000 Heavy Duty Battery Powered Instruments", by Stryker®, no date, 12 pages.

Instruction manual entitled "The Hall® Orthair™ System", by Zimmer USA, no date, 12 pages.

Product Brochure entitled "Maxion™ Cordless Powered Instrument System, Assembly, Operation and Maintenance", by 3M HeathCare, no date, 6 pages.

Product Brochure entitled "Hall® Versipower™ Dual Power Orthopaedic Instruments", by Zimmer, 1989, no month, 6 pages.

Product insert entitled "Mark III Electrical Tool", by Avery Dennison, no date, 1 page.

Operating instructions entitled "Mark III Electrical Tool", by Avery Dennison, no date, 12 pages.

Product Brochure entitled "The Air Driver II from 3M", by 3M, no date, 2 pages.

Product Brochure entitled "Powered Instrumentation for Large Bone Surgery", by Stryker®, no date, 15 pages.

Product Brochure entitled "Sagittal Saw Attachment", by 3M, no date, 2 pages.

Product Brochure entitled "Cordless 200 Reamer", by Dyonics, 1984, no month, 2 pages.

Product Brochure entitled "System II OrthoPower 90 Battery Powered Surgical Instruments", by Stryker®, 1986, no month, 17 pages.

Maintenance manual and operating instructions entitled "System 2000 Battery Powered Instruments", by Styker®, 1993, no month, 17 pages.

* cited by examiner

BATTERY FOR A POWER TOOL WITH A BATTERY PACK EJECTOR

CROSS REFERENCE TO RELATED APPLICATIONS

This is a continuation of U.S. Ser. No. 10/827,465, filed Apr. 19, 2004 now U.S. Pat. No. 8,181,717, which is a continuation of U.S. Ser. No. 10/652,915, filed Aug. 29, 2003 now U.S. Pat. No. 7,661,486, which is a continuation of U.S. Ser. No. 09/938,202, filed Aug. 24, 2001 (now U.S. Pat. No. 6,729,413). The disclosures of the above applications are incorporated herein by reference.

FIELD AND BACKGROUND OF THE INVENTION

The present invention relates to power tools and, more particularly, to battery operated power tools which include a mechanism for ejecting the battery from the tool.

In the power tool field, as battery technology improves, tradesmen are turning to battery operated tools. As the tradesmen utilize the battery operated tools, they desire tools with increased power, extended battery life, and longer durability. However, as tradesmen require more power and extended battery life, battery size and weight increase. As this occurs, it is desirable to have additional help to eject the batteries from the power tools.

Various types of battery ejectors exist in the field. Ordinarily, the batteries are surrounded by the housing and the biasing mechanism applies a force on the battery or battery pack near the electrical contact area. This is illustrated in U.S. Pat. No. 4,146,682 to Nakao; U.S. Pat. No. 5,681,667 to Bunyea et al; U.S. Pat. No. 5,225,293 to Mitchell et al; and U.S. Pat. No. 5,637,417 to Engmark et al.

U.S. Pat. No. 6,223,835 to Habedank et al, which is assigned to the assignee of the present invention, discloses a mechanism for assisting an ejecting battery from a power tool. The mechanism includes a cap which is biased by a spring or springs which are positioned within the housing. The cap acts upon the battery to apply a removal force onto the battery. Here, the top of the battery and the end of the battery are surrounded by the power tool housing.

The cited art does not provide a solution for ejecting a battery which is freely suspended by its coupling mechanism. In this case, the battery is supported on only one side and the remaining battery extends from the housing of the power tool. The majority of battery ejectors for these types of batteries are like those illustrated in U.S. Pat. No. 5,213,913. Here, the latching mechanisms, when moved, allow gravity to drop the battery from the housing. Thus, there was no need for a biasing force to remove the battery pack from the tool housing.

SUMMARY OF THE INVENTION

The present invention provides the art with a battery ejection mechanism which is utilized on batteries which are suspended from the power tool. The suspended battery includes rails which enable the battery to slide onto the power tool. The biasing member is positioned adjacent to the battery rails for ejecting the battery. Also, the biasing member is positioned in alignment such that the biasing member contacts the face of the rail mechanism of the battery to eject the battery. The battery is partly ejected from the tool housing so that it can be removed from the housing.

In accordance with a first aspect of the present invention, a mechanism for ejecting a battery comprises a frame with a cavity in the frame to receive a battery pack. A receiving member extends from the frame and is adjacent the cavity. The receiving member meshes with a member on the battery pack to maintain the battery pack in the cavity. A biasing member is positioned in the cavity adjacent the receiving member. The biasing member ejects the battery pack from the ejecting mechanism. A member to retain the biasing member in the cavity is secured to the frame. The member guides the meshing portion of the battery pack with the receiving member into contact with the biasing member such that when the battery pack is locked onto the frame, the biasing member is in a compressed condition and when the battery pack is in an unlocked positioned the biasing member ejects the battery pack from the frame. The cavity is defined by a pair of opposing side walls and an end wall adjoining the opposing side walls and an end wall adjoining the opposing side walls. The receiving member includes a pair of rails extending from each side wall. The rails oppose one another. Channels are formed adjacent the side walls and between the rails and frame to receive mating rails on the battery pack. The biasing retaining member is adjacent the channel. The biasing retaining member is a tab extending from the side wall of the frame. The biasing member includes a pair of helical springs. The helical springs extend from the end wall and are aligned coincident with the channel.

In accordance with a second aspect of the invention, a power tool comprises a housing with a motor in the housing. An output is coupled with the motor. An activation member is included to activate the motor. A mechanism on the housing receives a battery pack. The mechanism includes a frame, with a receiving member and an adjacent cavity. The receiving member meshes with a member on the battery pack to hold the battery pack in the cavity. A biasing member is positioned in the cavity adjacent the receiving member. The biasing member ejects the battery pack from the ejecting mechanism. A member to retain the biasing member in the cavity is secured to the frame. The member guides the meshing portion of the battery pack with the receiving member into contact with the biasing member such that when the battery pack is locked onto the frame, the biasing member is in a compressed condition and when the battery pack is in an unlocked positioned the biasing member ejects the battery pack from the frame. The cavity is defined by a pair of opposing side walls and an end wall adjoining the opposing side walls. The receiving member includes a pair of rails extending from each side wall. The rails oppose one another. Channels are formed adjacent the side walls and between the rails and frame to receive mating rails on the battery pack. The biasing retaining member is adjacent the channel. The biasing retaining member is a tab extending from the side wall of the frame. The biasing member includes a pair of helical springs. The helical springs extend from the end wall and are aligned coincident with the channel. A battery pack is received in the battery pack receiving mechanism. The battery pack includes a pair of rails mating in the channels. The battery pack rails include an upper portion and a lower portion and a channel between the upper and lower portions. The extending tabs extend into the channel of the battery pack rails. The battery pack rails include end faces that abut the helical springs. The battery rails slide in the channels and the frame rails freely suspend the battery pack from the tool housing. The helical springs are positioned in the tool electrical connector housing.

From the following detailed description, taken in conjunction with the drawings and subjoined claims, other objects and advantages of the present invention will become apparent to those skilled in the art.

DETAILED DESCRIPTION OF THE PREFERRED EMBODIMENTS

Figure 1:
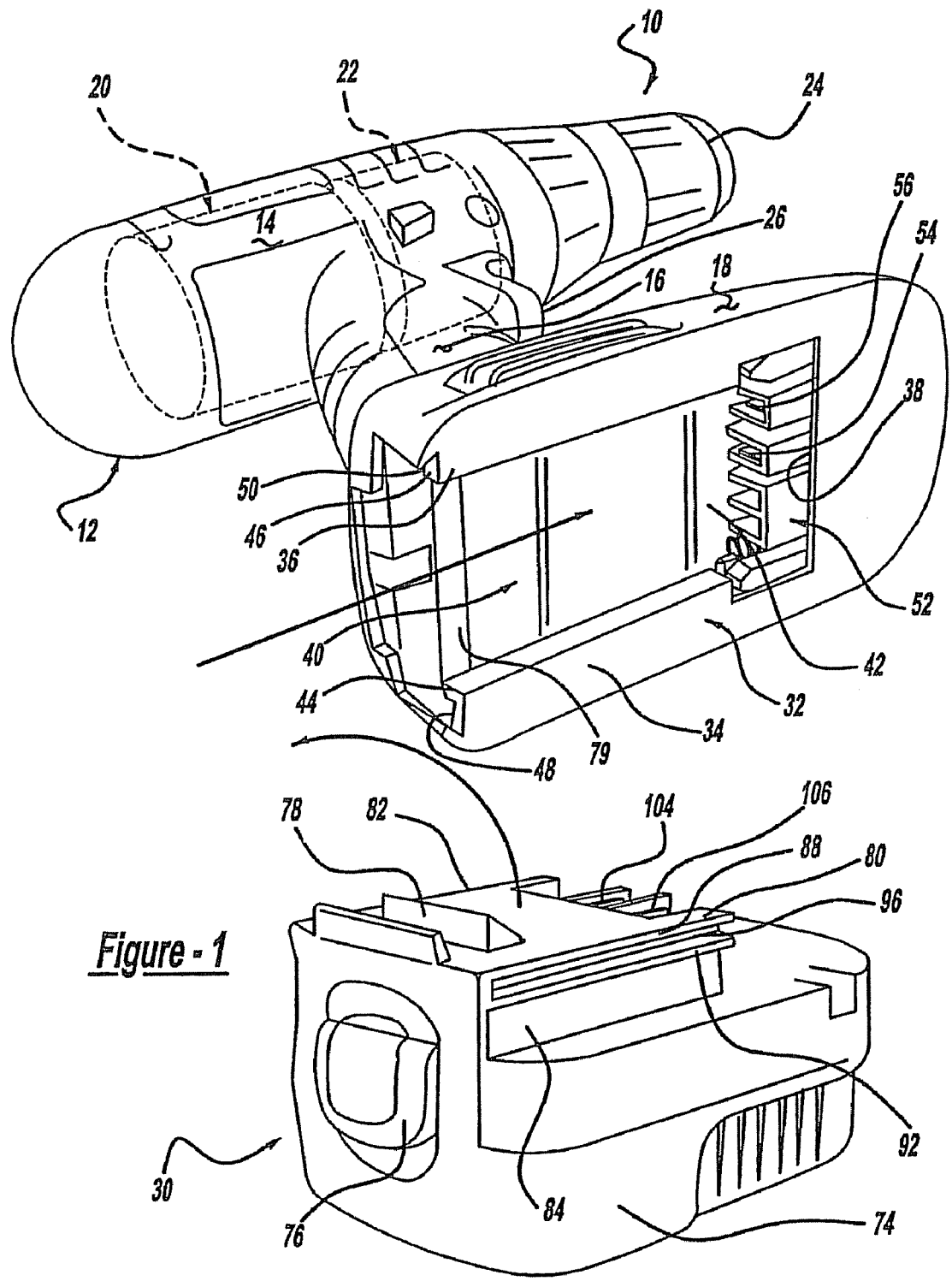
FIG. 1 is a bottom perspective view of a power tool in accordance with the present invention.
Figure 2:
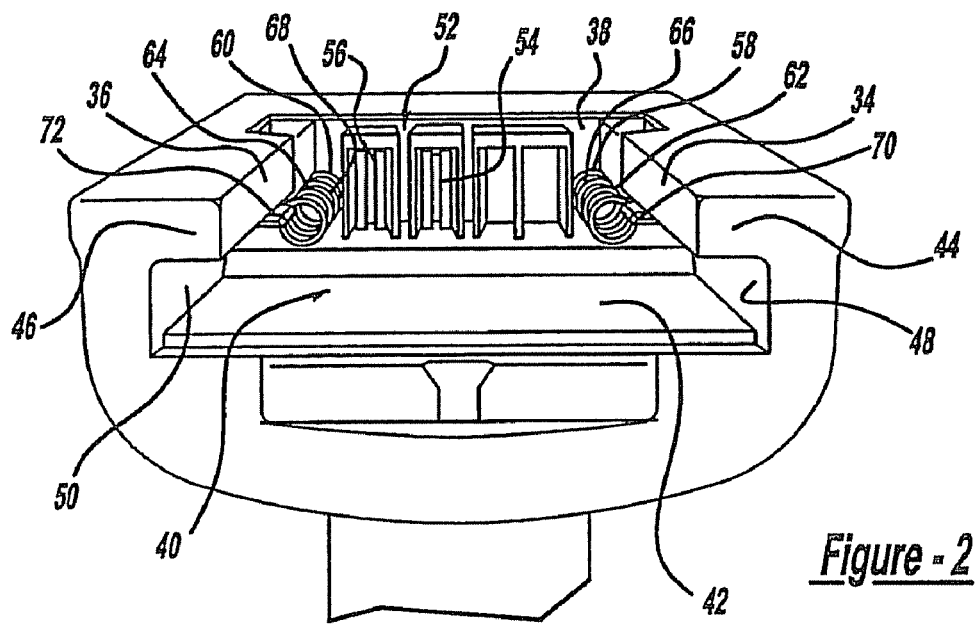
FIG. 2 is a side perspective view of the battery receiving mechanism of the drill of FIG. 1.

Turning to the figures, particularly FIG. 1, a power tool is illustrated and designated with the reference numeral 10. The power tool 10 includes a housing 12 which includes a motor portion 14 and a handle portion 16 as well as a base portion 18. A motor 20 is positioned in the housing 12. An output 22 is coupled with the motor 20 and in this case includes a chuck 24. An activation member 26 is positioned on the handle portion. The activation member is electrically coupled with the motor 20 as well as with a battery pack 30 which supplies the power to the power tool 10.

The housing base portion 18 includes a battery pack receiving frame 32. The battery pack receiving frame 32 includes a pair of opposing side walls 34 and 36 as well as an end wall 38. The side walls 34, 36 and end wall 38 define a battery receiving cavity 40. The cavity 40 is limited on the frame by a top wall or base 42. Each side wall 34, 36 includes a rail 44, 46. The rails 44, 46 extend longitudinally along the frame from an end of the housing base portion 18 towards the end wall 38. Channels 48, 50 are formed between the rails 44, 46 and the top wall 42. The channels 48, 50 receive the battery pack 30.

Figure 3:
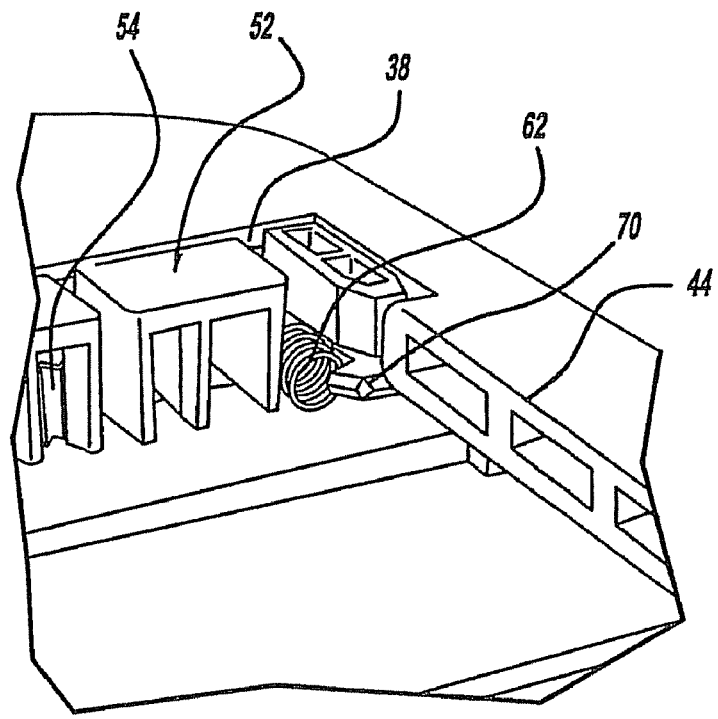
FIG. 3 is an enlarged perspective view of a portion of the receiving element of FIG. 2.
Figure 4:
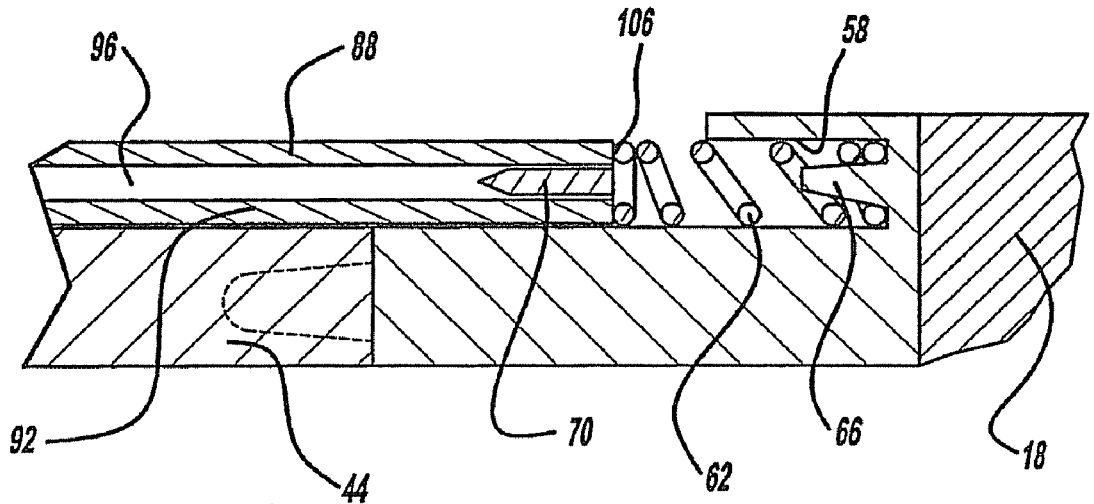
FIG. 4 is a cross-section view of FIG. 1.
Figure 5:
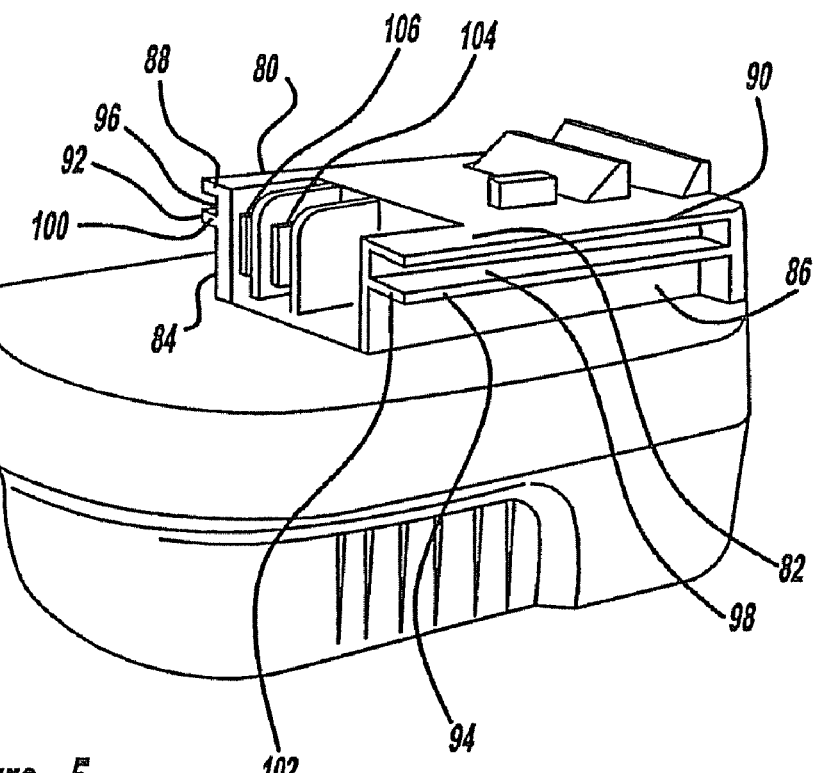
FIG. 5 is a perspective view of the battery removed from the tool.

An electrical connector housing 52 is coupled with the housing base portion 18 adjacent the end wall 38. The electrical connector housing 52 includes electrical connectors 54, 56 which couple with electrical connectors of the battery pack 30. The electrical connector housing 52 includes bores 58, 60 which receive helical springs 62, 64. Spring guides 66, 68 are positioned at the bottom of the bores 58, 60 to guide the helical springs 62, 64. Also, the guides 66, 68 maintain the springs in the bores 58, 60 during assembly. Tabs 70, 72 extend from the side walls 34, 36 of the receiving frame 32. The tabs 70, 72 capture the helical springs 62, 64 to maintain the springs 62, 64 in the bores 58, 60. The tabs 70, 72 are positioned between the rails and the top wall 42 aligned with the channels 48, 50 as seen in FIG. 3. The tabs 70, 72 are tapered from the frame 32 to the free end. Also, the tabs 70, 72 are tapered along their thickness as seen in FIGS. 3 and 4. The tapers assist in guiding the battery pack 30.

The battery pack 30 includes a housing 74 with a plurality of batteries (not shown) positioned within the housing. A release button 76 which is coupled with a latch 78 is positioned on the housing 74. The latch 78 secures the battery pack 30 to the top wall 42 of the housing base portion 18. The battery housing 74 includes rails 80, 82 longitudinally extending along the top surface of the battery pack 30. The rails define channels 84, 86 which mesh with the rails 44, 46 of the housing base portion 18. The rails 80, 82 include upper surfaces 88, 90 and lower surfaces 92, 94. The upper and lower surfaces define channels 96, 98. The rails 80, 82 are received in the channels 48, 50 of the housing base receiving frame 32. The battery pack 30 includes electrical connectors 104, 106. The electrical connectors 104, 106 are received in the electrical connectors 54, 56 for powering the power tool 10.

The battery pack 30 is coupled with the housing receiving frame 32 as follows. The battery pack rails 80, 82 are positioned in the frame channels 48, 50. The battery pack 30 is slid, rail upon rail, into the receiving frame 32 until the latch 78 secures in a catch 79 in the top wall 42. As this occurs, the battery rail faces 100, 102 abut the helical springs 62, 64. Prior to this happening, the battery rail channels 96, 98 receive the extending tabs 70, 72. The tabs 70, 72 guide the rails 80, 82 into contact with the springs 62, 64. The contacting of the springs 62, 64 by the battery rail faces 100, 102 occurs prior to the latch locking in the catch of the top wall 42. Accordingly, the springs 62, 64 compress into the bores 58, 60.

To release the battery pack 30 from the power tool 10, the button 76 is moved downwardly. As this occurs, the latch 78 also moves downwardly removing the latch from the catch 79 on the top wall 42. As this occurs, the battery pack 30 is no longer locked in position on the power tool housing receiving frame 32. At that time, the springs 62, 64, which are designed to have enough force to overcome the weight of the battery pack 30 and the terminal friction, eject the battery pack 30 away from the electrical connector housing 52. The battery pack 30 is ejected partially from the battery pack receiving frame 32. Also, the ejection disconnects the battery pack from the terminals.

While the above detailed description describes the preferred embodiment of the present invention, the invention is susceptible to modification, variation and alteration without deviating from the scope and fair meaning of the subjoined claims.

What is claimed is:

1. A battery pack comprising:
   a housing for retaining a battery;
   a retention mechanism coupled with said housing, said retention mechanism for retaining said battery pack on a power tool, said retention mechanism including a pair of rails extending along said housing, the rails being located on opposite sides of said battery pack and facing outwardly, each rail including a first channel, said first channel adapted to receive a tab on the power tool to guide the battery pack into position on the power tool; and
   an electrical connector extending from said housing adapted for coupling with an electrical connector on the power tool for electrically coupling the battery pack with the power tool;
   wherein said rails further comprise an upper portion and a lower portion, the upper and lower portions being at least partially spaced from one another along a direction from the base to the top of the housing, the at least partial spacing being visible from the outward direction, with said first channels between said upper and lower portions; and
   wherein second channels are formed between an upper surface of the battery pack housing and the lower portions of the rails.

2. The battery pack according to claim 1, wherein said housing has an overall rectangular configuration with a pair of sidewalls parallel to a longitudinal axis and a pair of end walls continuous with said sidewalls and perpendicular to said axis and a bottom wall and a top wall with said retention mechanism extending from said top wall.

3. The battery pack according to claim 1, further comprising a release button positioned on a wall for activating a latch that extends from a top wall.

4. The battery pack according to claim 1, wherein said retention mechanism is acted on by a biasing mechanism for biasing the battery pack in a direction away from a power tool when a release button on said battery pack is activated.

5. A battery pack comprising:
   a housing for retaining a battery, said housing having a side wall, a base and a top;
   a retaining mechanism for retaining the battery pack in a power tool, said retaining mechanism including mating members for coupling with mating members on the power tool; and
   a release mechanism for securing and releasing the battery pack from a power tool, said release mechanism including a release button and a latch mechanism; and
   an electrical connector adapted for coupling with an electrical connector on the power tool for electrically coupling the battery pack with the power tool;
   wherein said retaining mechanism includes at least two rails extending along said housing, the at least two rails being located on opposite sides of said battery pack and facing outwardly;
   wherein said rails each comprise an upper portion and a lower portion, the upper and lower portions being at least partially spaced from one another along a direction from the base to the top of the housing, the at least partial spacing being visible from the outward direction;
   wherein channels are formed between an upper surface of the battery pack housing and the lower portions of the rails.

6. The battery pack of claim 5, wherein said retention mechanism projects from said top.

7. The battery pack of claim 6, wherein said latch projects from said retention mechanism.

8. The battery pack of claim 5, wherein said latch automatically engages the power tool as the battery pack is slid onto the power tool.

9. A method for coupling a battery pack with a tool comprising:
   providing a power tool including a frame for receiving a battery pack, said frame including a pair of channels and a catch;
   providing a battery pack including a housing for retaining a battery, said housing having a side wall, a base and a top; a retention mechanism coupled with said housing, said retention mechanism for retaining said battery pack on a power tool, said retention mechanism including at least two rails extending along said housing, the at least two rails being located on opposite sides of said battery pack and facing outwardly; and an electrical connector adapted for coupling with an electrical connector on the power tool for electrically coupling the battery pack with the power tool wherein said rails each comprise an upper portion and a lower portion, the upper and lower portions being at least partially spaced from one another along a direction from the base to the top of the housing, the at least partial spacing being visible from the outward direction;
   positioning said rails of said battery pack in said channels of said frame;
   moving said battery pack and said power tool toward one another;
   engaging said release mechanism with said latch for locking said battery pack and power tool together;
   electrically coupling said battery pack electrical connector with an electrical connector of said power tool.

10. The method of coupling a battery pack with a tool of claim 9, further including releasing said battery pack from said power tool.

11. The method of coupling a battery pack with a tool of claim 10, further comprising activating said release mechanism.

12. The method of coupling a battery pack with a tool of claim 11, further comprising releasing said release mechanism from said latch.

13. The method of coupling a battery pack with a tool of claim 12, further comprising ejecting said battery pack from said power tool.

* * * * *